United States Patent
Barrand et al.

(10) Patent No.: US 11,532,015 B2
(45) Date of Patent: *Dec. 20, 2022

(54) SYSTEMS AND METHODS FOR OPTIMIZING MESSAGE NOTIFICATION TIMING BASED ON ELECTRONIC CONTENT CONSUMPTION ASSOCIATED WITH A GEOGRAPHIC LOCATION

(71) Applicant: Verizon Patent and Licensing Inc., Basking Ridge, NJ (US)

(72) Inventors: Bryce Barrand, Ashburn, VA (US); Patrick McDevitt, Hanover, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/304,399

(22) Filed: Jun. 21, 2021

(65) Prior Publication Data

US 2021/0312498 A1    Oct. 7, 2021

Related U.S. Application Data

(63) Continuation of application No. 15/075,367, filed on Mar. 21, 2016, now Pat. No. 11,068,938, which is a
(Continued)

(51) Int. Cl.
*G06Q 30/02* (2012.01)
*H04W 4/021* (2018.01)
(Continued)

(52) U.S. Cl.
CPC ..... *G06Q 30/0261* (2013.01); *G06Q 30/0241* (2013.01); *H04L 51/224* (2022.05);
(Continued)

(58) Field of Classification Search
CPC .............. G06Q 30/0261; G06Q 30/0241; H04L 51/24; H04L 67/10; H04L 67/18;
(Continued)

(56) References Cited

U.S. PATENT DOCUMENTS

| 5,946,618 A | 8/1999 | Agre et al. |
| 6,601,012 B1 | 7/2003 | Horvitz et al. |

(Continued)

FOREIGN PATENT DOCUMENTS

| CN | 103329159 | 9/2013 |
| EP | 2584516 | 4/2013 |
| WO | 2012/087472 | 6/2012 |

OTHER PUBLICATIONS

Examination Report pursuant to Article 94(3) EPC dated Jun. 8, 2015 in corresponding European Patent Application No. 15 156 913.4, filed on Feb. 27, 2015 (7 pages).

(Continued)

*Primary Examiner* — James T Tsai

(57) ABSTRACT

Systems and methods are provided for timing message notifications to be provided to mobile device users based on their geographic locations with respect to geographic areas associated with a threshold level of content consumption. The timing of message notifications may be controlled in order to optimize the chances of delivering targeted content to a mobile device user based on the current geographic location of the user's device relative to a threshold level of content consumption area. As mobile device users may be more likely to launch a client application in a place where other users are currently consuming content, a general message notification sent to the user's device located in a geographic area associated with a threshold level of content consumption, may increase the likelihood that the user will (Continued)

launch the client application and thereby, allow targeted content to be delivered to the user's mobile device.

20 Claims, 8 Drawing Sheets

Related U.S. Application Data continuation of application No. 14/194,108, filed on Feb. 28, 2014, now Pat. No. 9,325,654.

(51) Int. Cl.
| | |
|---|---|
| *H04L 51/224* | (2022.01) |
| *H04L 67/52* | (2022.01) |
| *H04L 67/55* | (2022.01) |
| *H04L 67/10* | (2022.01) |
| *H04W 4/02* | (2018.01) |
| *H04W 4/12* | (2009.01) |
| *H04W 4/18* | (2009.01) |
| *H04L 67/50* | (2022.01) |

(52) U.S. Cl.
CPC .............. *H04L 67/10* (2013.01); *H04L 67/52* (2022.05); *H04L 67/55* (2022.05); *H04W 4/021* (2013.01); *H04W 4/022* (2013.01); *H04W 4/025* (2013.01); *H04W 4/12* (2013.01); *H04W 4/185* (2013.01); *H04L 67/535* (2022.05)

(58) Field of Classification Search
CPC ........ H04L 67/26; H04L 67/22; H04W 4/021; H04W 4/022; H04W 4/025; H04W 4/12; H04W 4/185
See application file for complete search history.

(56) References Cited

U.S. PATENT DOCUMENTS

| | | | |
|---|---|---|---|
| 7,418,451 B2 | 8/2008 | Leung et al. | |
| 8,489,111 B2 | 7/2013 | Chawla | |
| 8,532,667 B2 | 9/2013 | Chan et al. | |
| 8,943,126 B1 | 1/2015 | Feldman | |
| 9,015,692 B1 * | 4/2015 | Clavel | G06F 16/24575 |
| | | | 717/168 |
| 9,043,329 B1 | 5/2015 | Patton et al. | |
| 9,786,170 B2 | 10/2017 | Roy et al. | |
| 2002/0069037 A1 | 6/2002 | Hendrickson et al. | |
| 2003/0115586 A1 | 6/2003 | Lejouan et al. | |
| 2004/0030753 A1 | 2/2004 | Horvitz | |
| 2004/0166878 A1 | 8/2004 | Erskine et al. | |
| 2005/0039136 A1 | 2/2005 | Othmer | |
| 2005/0209921 A1 | 9/2005 | Roberts et al. | |
| 2006/0109857 A1 | 5/2006 | Herrmann | |
| 2007/0088603 A1 | 4/2007 | Jouppi et al. | |
| 2007/0232274 A1 | 10/2007 | Jung et al. | |
| 2008/0262928 A1 * | 10/2008 | Michaelis | G06Q 30/02 |
| | | | 705/14.39 |
| 2008/0288976 A1 | 11/2008 | Carson et al. | |
| 2009/0006145 A1 | 1/2009 | Duggal et al. | |
| 2009/0006194 A1 | 1/2009 | Sridharan et al. | |
| 2010/0113066 A1 | 5/2010 | Dingler et al. | |
| 2010/0159904 A1 | 6/2010 | Colligan et al. | |
| 2010/0293170 A1 | 11/2010 | Hall et al. | |
| 2010/0323716 A1 | 12/2010 | Jaffri | |
| 2010/0324995 A1 | 12/2010 | Ward et al. | |
| 2011/0195748 A1 | 8/2011 | Main et al. | |
| 2011/0208592 A1 | 8/2011 | Golder | |
| 2012/0023548 A1 | 1/2012 | Alfano et al. | |
| 2012/0130796 A1 | 5/2012 | Busch | |
| 2012/0159568 A1 | 6/2012 | He | |
| 2012/0225672 A1 | 9/2012 | Tholkes et al. | |
| 2012/0278194 A1 | 11/2012 | Dewan et al. | |
| 2012/0284107 A1 | 11/2012 | Gernaat et al. | |
| 2012/0306660 A1 | 12/2012 | Stopel et al. | |
| 2012/0310527 A1 | 12/2012 | Yariv et al. | |
| 2012/0323692 A1 | 12/2012 | Shutter | |
| 2013/0091016 A1 | 4/2013 | Shutter | |
| 2013/0103307 A1 | 4/2013 | Sartipi et al. | |
| 2013/0110649 A1 | 5/2013 | Sugiura et al. | |
| 2013/0149993 A1 | 6/2013 | Cao et al. | |
| 2013/0159463 A1 | 6/2013 | Bentley et al. | |
| 2013/0235027 A1 | 9/2013 | Sharifi et al. | |
| 2013/0252630 A1 | 9/2013 | Edge et al. | |
| 2013/0267196 A1 | 10/2013 | Leemet et al. | |
| 2013/0267253 A1 | 10/2013 | Case et al. | |
| 2013/0275198 A1 * | 10/2013 | Zeto, III | G06Q 30/0225 |
| | | | 705/14.26 |
| 2013/0304910 A1 | 11/2013 | Hanlon et al. | |
| 2013/0318157 A1 | 11/2013 | Harrison | |
| 2013/0332274 A1 * | 12/2013 | Faith | G06Q 30/0242 |
| | | | 705/14.55 |
| 2014/0019230 A1 * | 1/2014 | Lawson | G06Q 30/02 |
| | | | 705/14.58 |
| 2014/0082062 A1 | 3/2014 | Bellver et al. | |
| 2014/0095296 A1 | 4/2014 | Angell et al. | |
| 2014/0095617 A1 | 4/2014 | Chan et al. | |
| 2014/0101685 A1 | 4/2014 | Kitts et al. | |
| 2014/0155094 A1 | 6/2014 | Zises | |
| 2014/0156410 A1 | 6/2014 | Wuersch et al. | |
| 2014/0164118 A1 | 6/2014 | Polachi | |
| 2014/0188956 A1 | 7/2014 | Subba et al. | |
| 2014/0242947 A1 | 8/2014 | Ali et al. | |
| 2014/0278920 A1 | 9/2014 | Holden | |
| 2014/0309864 A1 | 10/2014 | Ricci | |
| 2014/0344050 A1 | 11/2014 | McKinley et al. | |
| 2014/0379520 A1 | 12/2014 | Nemery et al. | |
| 2015/0073709 A1 | 3/2015 | Huang | |
| 2015/0095355 A1 | 4/2015 | Patton | |
| 2015/0105106 A1 | 4/2015 | Masterman | |
| 2015/0142789 A1 | 5/2015 | Parundekar et al. | |
| 2015/0148061 A1 | 5/2015 | Koukoumidis et al. | |
| 2015/0163629 A1 | 6/2015 | Cheung | |
| 2015/0181016 A1 | 6/2015 | Jain et al. | |
| 2015/0186497 A1 | 7/2015 | Patton et al. | |
| 2015/0207893 A1 | 7/2015 | Lee | |
| 2015/0249632 A1 | 9/2015 | Barrand et al. | |
| 2015/0326624 A1 | 11/2015 | Rajendran et al. | |
| 2016/0034712 A1 | 2/2016 | Patton et al. | |
| 2016/0344824 A1 | 11/2016 | Wilden et al. | |

OTHER PUBLICATIONS

G. Kotsis, et al. "Generative workload models of Internet traffic," Proceedings of ICICS, 1997 International Conference on Information, Communications and Signal Processing. Theme: Trends in Information Systems Engineering and Wireless Multimedia Communications.

International Search Report and Written Opinion issued in corresponding PCT/US2015/031391, dated Aug. 20, 2015 (6 pages).

Phil Tian, Addicam V. Sanjay, Kunapareddy Chiranjeevi, and Shahzad Malik Malik. 2012. Intelligent advertising framework for digital signage. In Proceedings of the 18th ACM SIGKDD international conference on Knowledge discovery and data mining (KDD '12). ACM, New York, NY, USA1532-1535. DOI=http://dx.doi.org/10.1145/2339530.2339773.

S. Chava et al, "Cost-Aware Mobile Web Browsing," in IEEE Pervasive Computing, vol. 11, No. 3, pp. 34-42, Mar. 2012.

"Louisiana joins in the national "it can wait" movement to halt texting while driving: Louisiana hosts local event encouraging people to pledge "no text on board"", (Sep. 19, 2012). U.S. Newswire Retrieved from https://dialog.proquest.com/professional/docview/1069240199?accountid=131444 (Year: 2012).

"T-Mobile Introduces Drive Smart Android App, Block Texting While Driving", TmoNews.com, Jan. 19, 2011, https://web.archive.org/web/20110123001021/https://www.tmonews.com/2011/01/t-mobile-introduces-drive-smart-android-app-block-texting-while-driving/ (Year: 2011).

(56) References Cited

OTHER PUBLICATIONS

Reed, "New AT&T app blocks SMS junkies from texting while driving; new AT&T Drive Mode debuts in time for labor day", Network World, NA. Retrieved from https://dialog.proquest.com/professional/docview/887672963?accountid=131444 (Year: 2011).

* cited by examiner

SYSTEMS AND METHODS FOR OPTIMIZING MESSAGE NOTIFICATION TIMING BASED ON ELECTRONIC CONTENT CONSUMPTION ASSOCIATED WITH A GEOGRAPHIC LOCATION

CROSS-REFERENCE TO RELATED APPLICATION(S)

This patent application is a continuation of and claims the benefit of priority to U.S. patent application Ser. No. 15/075,367, filed Mar. 21, 2016, which is a continuation of and claims the benefit of priority to U.S. patent application Ser. No. 14/194,108, filed Feb. 28, 2014, now U.S. Pat. No. 9,325,654, issued Apr. 26, 2016, the entireties of which are incorporated herein by reference.

TECHNICAL FIELD

The present disclosure relates generally to geo-fences and, more particularly, to providing messaging services to mobile device users based on their respective geographic location.

BACKGROUND

Mobile devices, such as smartphones, now allow users to perform a variety of tasks that traditionally required different types of devices. For example, a user may be able to use different client applications executable at the same mobile device to browse online content, play audio files, capture digital images, view directions for navigating between different locations or points of interest, and exchange messages between other users or computing devices via a mobile communication network. A user may also download and install various third-party client applications at the user's mobile device for viewing information and content related to general topics of interest. An application developer or affiliated service provider may use such a client application to provide different services to the user. Such services may include messaging services to which the user may subscribe in order to receive, for example, real-time message notifications or breaking news alerts at the user's mobile device. The message notifications or alerts that are sent (or "pushed") by a service provider for a particular client application may be displayed within a general notifications window via a user interface of the operating system at the user's mobile device, even though the client application may be closed or may not be actively executing at the mobile device when such notifications are received.

In addition to the message notifications or alerts provided by a service provider associated with the client application, third-party content providers may use the client application to deliver targeted content (e.g., advertisements) to the user at the mobile device. In contrast with the aforementioned message notifications that may be displayed within a general notifications window of the operating system's user interface, the targeted content from a third-party content provider is typically displayed within a dedicated portion of a user interface of the client application itself while it executes at the mobile device. An example of such targeted content may include, but is not limited to, an advertisement displayed within a pop-up window for a webpage loaded within a mobile web browser. Thus, conventional solutions for delivering targeted content to a user's mobile device typically require the client application to be open or actively executing at the mobile device in order for the content to be displayed to the user at the mobile device.

SUMMARY OF THE DISCLOSURE

Embodiments disclose systems and methods for timing message notifications to optimize delivery of targeted content to mobile device users by increasing the likelihood a user will open or execute a client application.

In certain embodiments, a user's likelihood of opening or executing a client application is determined by whether or not the user's mobile device is within a geographic area associated with a threshold level of content consumption. In some embodiments, content consumption is measured based on data usage. In other embodiments, the content consumption is measured by interaction between users and mobile devices, including, for example, the number of opened or executed client applications, the number of people using their phones for any task, the number of new pages requested by mobile devices, the number of launched web browsers, the number of ad requests from application or browsers, or any combinations thereof. A geographic area associated with a threshold level of content consumption could be designated when any means of measuring content consumption reaches a minimum threshold per a unit of area over a certain segment of time. The minimum threshold can be preset by an application developer, affiliated service provider, or third-party content provider. In some embodiments, the geographic areas associated with a threshold level of content consumption are based off of historical content consumption for that location. A geo-fence can be permanently created and placed at this area. In other embodiments, geographic areas associated with a threshold level of content consumption can be determined based on real-time content consumption data and a flash geo-fence can then be created for those real-time identified areas.

According to certain embodiments, methods are disclosed for timing message notifications to optimize delivery of targeted content to mobile device users by increasing the likelihood that a user will open or execute a client application. Upon receiving an indication of a message to be sent for a client application executable at a mobile device of a user, a current geographic location of the mobile device is requested via a communication network. Upon receiving the requested current geographic location of the mobile device, it is determined whether the current geographic location of the mobile device is within a geographic area associated with a threshold level of content consumption. When the current geographic location of the mobile device is determined to be within the geographic area associated with a threshold level of content consumption, the message is sent for display to the user at the mobile device via a message notification interface of an operating system of the mobile device. When the current geographic location of the mobile device is determined not to be within the geographic area associated with a threshold level of content consumption, the message is added to a message queue. The added message is to be sent from the message queue for display to the user at the mobile device either when a detected change in the current geographic location of the mobile device causes the mobile device to be determined to be within a geographic area associated with a threshold level of content consumption, or once the predetermined period of time is determined to have elapsed, whichever comes first.

According to certain embodiments, systems are disclosed for timing message notifications to optimize delivery of targeted content to mobile device users. One system includes a memory having processor-readable instructions stored therein and a processor configured to access the memory and execute the processor-readable instructions, which when executed by the processor configures the processor to perform a plurality of functions, including functions to: receive an indication of a message to be sent for a client application executable at a mobile device of a user; request a current geographic location of the mobile device via a communication network based on the received indication; receive the requested current geographic location of the mobile device; determine whether the current geographic location of the mobile device is within a geographic area associated with a threshold level of content consumption; send the message for display to the user at the mobile device via a message notification interface of an operating system of the mobile device when the current geographic location of the mobile device is determined to be within the geographic area associated with a threshold level of content consumption; and add the message to a message queue when the current geographic location of the mobile device is determined not to be within the geographic area associated with a threshold level of content consumption, wherein the message is to be sent from the message queue for display to the user at the mobile device either when a detected change in the current geographic location of the mobile device causes the mobile device to be determined to be within a geographic area associated with a threshold level of content consumption, or once the predetermined period of time is determined to have elapsed, whichever comes first.

According to certain embodiments, a computer readable medium is disclosed as storing instructions that, when executed by a computer, cause the computer to perform functions to: receive an indication of a message to be sent for a client application executable at a mobile device of a user; request a current geographic location of the mobile device via a communication network based on the received indication; receive the requested current geographic location of the mobile device; determine whether the current geographic location of the mobile device is within a geographic area associated with a threshold level of content consumption; send the message for display to the user at the mobile device via a message notification interface of an operating system of the mobile device when the current geographic location of the mobile device is determined to be within the geographic area associated with a threshold level of content consumption; and add the message to a message queue when the current geographic location of the mobile device is determined not to be within the geographic area associated with a threshold level of content consumption, wherein the message is to be sent from the message queue for display to the user at the mobile device either when a detected change in the current geographic location of the mobile device causes the mobile device to be determined to be within the geographic area associated with a threshold level of content consumption, or once the predetermined period of time is determined to have elapsed, whichever comes first.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
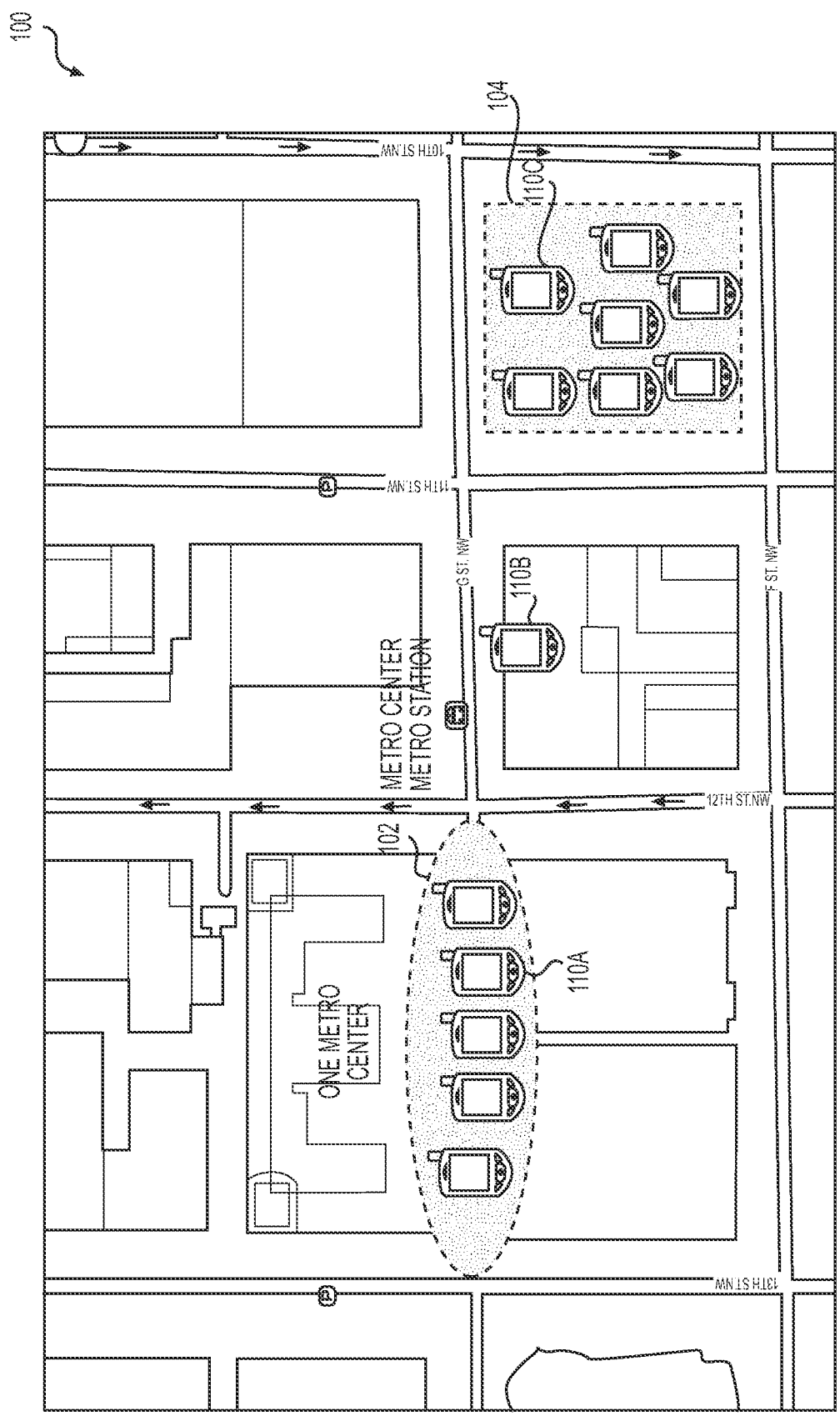
FIG. 1 is a view of a map showing multiple geo-fenced areas determined to have a threshold level of content consumption.

The present disclosure involves, among other things, the concept that message notifications or alerts can be used to entice users to open or execute a client application. However, the chance that a user will actually open or execute a client application when a message notification or alert is provided to the user's mobile device is not always high. Hence, these message notifications or alerts may sometimes fail to entice the user to open a client application because they are sent when the user is in a place and a time when he is unlikely to do so. Conventional solutions do not provide a means of maximizing the odds that a user will open a client application based on geographic location and time. For example, users may be more likely to launch a client application in a location in which other users are currently consuming content on their mobile devices. Yet, conventional solutions are not determining which areas have a high concentration of content consumption, much less determining whether a user is likely to open a client application based on whether other mobile device users, currently in the same geographic location, are doing so.

The present disclosure is directed to overcoming one or more of the above referenced issues. Specifically, the present disclosure is directed to controlling timing of message notifications in order to improve the effectiveness of the message notification by increasing the chances that a user will open or execute a client application.

Targeted content is typically displayed within a designated portion of the client application's own graphical user interface ("GUI") as it executes at the user's device, e.g., a banner advertisement presented in a bottom or top portion of the application's GUI (e.g., of a mobile browser). The targeted content is generally delivered to the user's device only when the client application is actively executing at the device, e.g., after the user has manually launched the application for execution via a user interface of the operating system at the mobile device. As explained in further detailed below, by sending a message notification to a user, the user will be enticed to manually launch the application associated with the message notification and thereby allow the delivery of targeted content to the user.

Specifically, the user will not always open a client application at the time a message notification is sent, the techniques disclosed herein may be used to increase the likelihood that the user is in a place (and, optionally, a time) in which the user will likely launch the client application and thereby, allow targeted content to be delivered to the user's mobile device. By analyzing mobile device users as a whole, it is assumed users will be more likely to launch a client application in a location where other users have historically consumed or are currently consuming content in relatively high volume and/or frequency. Consequently, the delivery of a message notification may be more likely to entice a user to launch a client application when the location of the user's mobile device is determined to be within a geographic area associated with a threshold level of content consumption. For example, users may be more likely to launch a client application during rush hour at a bus stop than at three a.m. in a residential area. As a result, the odds a client application will be launched can be improved by waiting to send a message notification until the mobile device is within one of these "hot spots."

It can be determined when and where these "hot spots" for launching client applications may be, by tracking the content consumption of other users. For example, content consumption can be measured based on a number of statistics, including, but not limited to, amount of data usage, any interaction between the user and device, the number of opened or executed client applications, the number of people using their phones for any task, the number of new pages requested by mobile devices, the number of launched web browsers, the number of ad requests from applications or browsers, or any combinations thereof.

A geographic area associated with a threshold level of content consumption could be designated when any means of measuring content consumption (including those listed above) reaches a minimum threshold per a unit of area over a predetermined segment of time. This minimum threshold can be preset by the application developer, affiliated service provider, or third-party content provider.

Further, a geographic area associated with a threshold level of content consumption may be, for example, a predetermined geographic area of any size and shape, e.g., as determined from historic data of content consumption at that place and time. The bounds of the geographic area may be defined by, for example, a customized geo-fence or virtual perimeter surrounding a location typically associated with a threshold level of content consumption. A geographic area associated with a threshold level of content consumption may also be defined in real-time, determining whether or not that particular geographic area is currently consuming a large amount of content.

As briefly discussed above, by sending a message notification to a user, the user will be more likely to manually launch the application associated with the message notification and thereby, allow the delivery of targeted content to the user. The timing of the message notification can be controlled by queuing message notifications associated with a client application. The delivery of the message notification to the user's mobile device can then delayed for a predetermined period of time or until the current geographic location of the user's mobile device is determined to be within a geographic area associated with a threshold level of content consumption. When the message notification is eventually delivered to the user's mobile device and displayed within a general notifications window of the operating system's GUI at the device, the user may be more inclined to open the corresponding client application after viewing the message notification. In other words, the user may be more likely to launch the client application corresponding to a message notification (e.g., a breaking news alert) displayed at the user's device after viewing the message notification.

In an example, an application developer or affiliated information service provider, e.g., a news agency or other media outlet, associated with a client application may provide a mobile messaging service, to which the user may subscribe so as to authorize the service provider to send (e.g., "push") real-time message notifications (e.g., breaking news or other alerts) to the user's device via a mobile communication network. The notifications sent by a service provider associated with a client application executable at the user's device may be displayed within a general notifications window of a GUI of the device's operating system, even when the corresponding client application may not have been launched by the user or be actively executing at the mobile device.

It may be assumed that the mobile device user in the above example may be relatively unaware of the third-party content provider. Thus, while a user who has subscribed to messaging services offered by a service provider associated with a client application executable at the user's device may have authorized the application service provider to send general message notifications (e.g., push notifications) related to topics of interest to the user's device, the user may not have explicitly requested third-party content providers to send targeted content to the user's device in the same way. However, it may also be assumed for purposes of this example that the user has at least implicitly requested or authorized third-party content providers (e.g., with whom the application service provider may have entered into a partnership agreement) to deliver targeted content to the user's mobile device within a designated portion of the application's GUI while the client application is actively executing at the user's device (e.g., pursuant to terms and conditions of use accepted by the user).

In the above example, an authorized third-party content provider may also use the client application to deliver targeted content to the user's mobile device. To increase the probability that the user will open a particular client application, the push-notification is timed so that the user is in a geographic area associated with a threshold level of content consumption, meaning that other users are currently consuming or historically have consumed a high frequency and/or large amount of content at that time and in that location.

In some implementations, the mobile operating system may allow the user to launch the client application associated with a particular notification directly from the notification window by selecting the notification as it is displayed via the operating system GUI at the mobile device. Thus, the techniques disclosed herein may be used to optimize the timing of the message notification displayed at the user's device so as to increase the probability that the corresponding client application is launched because the user is in an area determined to be a geographic area associated with a threshold level of content consumption, e.g., by enticing the user to launch the client application when it is inactive, after viewing the message notification.

Further, once a client application is opened or executed, the specific targeted content that is sent to the user's mobile device at a particular time may also be based on the current geographic location of the mobile device. The delivery of such geo-located content to the user's device may be triggered when, for example, the location of the user's mobile device is determined to be within a designated geographic area, e.g., covered by a geo-fence associated with the targeted content.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a view of a map 100 showing a plurality of geo-fenced areas having threshold levels of content consumption. As shown in FIG. 1, map 100 includes a geo-fenced area 102 and a geo-fenced area 104. These geo-fenced areas 102 and 104 may be static, e.g. predetermined based on historical content consumption in that geographical location and at a particular time. The geo-fenced areas may also be dynamic (e.g. determined in real-time based on whether there is a geographic area associated with a threshold level of content consumption).

In one example, the area may be a bus stop at rush hour with content consumption that is historically above a threshold level and located within geo-fenced area 102. In another example, the area may be outside of a business in the hours before a large sale (e.g. Black Friday). This area would not traditionally have a threshold level of content consumption, but as consumers wait in line for the sale, the consumers may be bored and as a result, be more likely to launch a client application. In such a situation, a level of content consumption of mobile device users in the area could be observed and tracked, and geo-fence 104 could be created around the geographic area associated with a threshold level of content consumption in real-time.

The boundaries or dimensions of each of the geo-fenced areas 102 and 104 may correspond to, for example, the shape and size of a building or other physical structure associated with a threshold level of content consumption (e.g., a restaurant, store, a bus stop, a concert venue, or other place where people are likely to consume content). However, it should be noted that geo-fenced areas 102 or 104 may be of any size and shape. For example, the size and shape of each geo-fenced area may be based on a predetermined radius around a geographic area with high consumption or on a predetermined ratio of content consumption to square feet.

Also, as shown in FIG. 1, map 100 indicates the geographic locations of a user device 110a, a user device 110b, and a user device 110c. Each of user devices 110a, 110b, and 110c may be implemented using, for example, any type of mobile computing device including, but not limited to, a laptop computer, tablet computer, mobile handset, smartphone, personal digital assistant (PDA), a dedicated portable Global Positioning System (GPS) navigation device, or similar type of mobile device. Further, each of user devices 110a, 110b, and 110c may be equipped with a GPS receiver or equivalent for registering GPS location data, e.g., latitude and longitude coordinates, at a particular point or over a period of time. However, it should be noted that the physical or geographic location of each of user devices 110a, 110b, and 110c may be determined or estimated using any one or a combination of various well-known techniques for deriving such geographic location information. Examples of such techniques include, but are not limited to, GPS, cell identification (e.g., using Cell ID), cellular tower triangulation, multilateration, Wi-Fi, and any other network or handset based technique for deriving or estimating the physical or geographic location of a mobile device via a mobile communication network.

Each of user devices 110a, 110b, and 110c may be configured to execute one or more client applications. Such a client application executable at each of user devices 110a, 110b, and 110c may be associated with, for example, an information service provider. Further, each of user devices 110a, 110b, and 110c may be configured to receive message notifications related to topics of interest (e.g., breaking news alerts) for a user at each device. As will be described in further detail below, such notifications may be sent to each of user devices 110a, 110b, and 110c by a message server via a mobile communications network. The message notifications may be sent by the message server as, for example, push notifications that are periodically sent to each device. However, it should be noted that the techniques disclosed herein are not limited to push notifications and that these techniques may be applied with any type of messaging scheme or protocol used to deliver message notifications to user devices 110a, 110b, and 110c. For example, any of user devices 110a, 110b, or 110c may be configured to request (or "pull") pending notification messages from the message server via the mobile communication network.

As described above, the message notifications delivered to any of user devices 110a, 110b, or 110c for a particular client application executable at the device may be displayed within, for example, a general notifications window or similar type of user control element of a GUI provided by a mobile operating system at the device, particularly when the client application has not been opened or launched by the user and thus, the client application is not actively executing at the user's device. Also, as described above, the user of each device may have subscribed to a service offered by an application service provider associated with a client application executable at the user's device, which authorizes the application service provider to send relevant message notifications (e.g., as push notifications) to the user's device.

While a particular client application may be associated with a service provider that is unrelated to any of the third-party content providers, the application service provider may have authorized each third-party content provider to provide targeted content for display within a designated portion of the client application's GUI as it executes at the device. Such authorization may be pursuant to, for example, a partnership or advertising agreement between the application service provider and the third-party content provider. Accordingly, the third-party content may provide targeted content to user device 110a via a mobile communication network, when the geographic location of mobile device 110a is determined to be within geo-fenced area 102 and an eligible client application, e.g., which may be associated with a service provider with whom the third-party content provider has a partnership agreement in place, is actively executing at user device 110a. Similarly, targeted content may be provided to an appropriate client application executing at user device 110c, when user device 110c is determined to be within geo-fenced area 104.

In an example, a user of a client application executable at user device 110a may have subscribed to a messaging service provided by an application service provider associated with the client application in order to receive push notifications related to topics or events of interest to the user. Such a messaging service may be hosted at a message server associated with the client application or application service provider. Additional details of such a message server will be described in further detail below in reference to FIGS. 2-4. Examples of different push notifications that may be sent for the user at user device 110a include, but are not limited to, news alerts related to topics or keywords previously specified by the user, system or service-related message notifications, public safety advisories, and notifications of comments or messages posted to an electronic message board by other users (e.g., members of a social networking group associated with the user of user device 110a). The push notifications may be periodically sent by, for example, a messaging service of the application service provider to user device 110a via a mobile communication network. The notifications received at user device 110a may be displayed in a general notifications window of a GUI provided by the operating system of user device 110a.

As indicated by map 100, the current geographic location of user device 110b in this example may not be within a geographic area associated with a threshold level of content consumption, e.g., corresponding to either of geo-fenced areas 102 or 104. Thus, upon determining that user device 110b is not currently located within a geographic area associated with a threshold level of content consumption, the above-described messaging service provided by the application service provider may add a new message to be sent (or pushed) as a notification to user device 110b to a message queue maintained by the message server. The current location of user device 110b may be forwarded to the consumption tracking server by an application server or message server associated with the application service provider In some implementations, a message or message notification that may be added to the message queue may be associated with an expiration time that may be used to determine the period of time that the message will be kept in the queue before being delivered to user device 110b, regardless of the device's current geographic location. The expiration time associated with a queued message may be based on, for example, a predetermined time period that reflects a priority level assigned to the particular message notification. For example, an important public advisory message or breaking news alert may be assigned a relatively high priority level, and therefore, be associated with a relatively short expiration time. Thus, such high priority message notifications may be kept in the queue for a relatively short time period or alternatively, be sent immediately to user device 110b, without being added to the message queue.

In the above example, user device 110b may be configured to periodically report its current geographic location to the application or message server as this location changes over a period of time. As will be described in further detail below, upon receiving an indication of a new or updated current geographic location of user device 110b, the message server may query the application server or message server to determine whether the updated geographic location is within a geographic area associated with a threshold level of content consumption. This determination may be made based on stored information identifying the locations and boundaries of various historical or real-time areas associated with a threshold level of content consumption.

If it is determined that the updated geographic location of user device 110b is within a geographic areas associated with a threshold level of content consumption, e.g., within geo-fenced area 102 or geo-fenced area 104, the message server may check the message queue for any previously queued messages. The message server may then send a message notification from the message queue to user device 110b, upon finding at least one message in the message queue.

In one example, once it is determined that a user device 110a, 110b, or 110c is within a new geographic area with a threshold level of content consumption, the message server may further query the content server to determine if the user device is also located within a geo-fence associated with targeted content. For example, if geo-fence 104 is also associated with a third-party content provider, the content server provides the application server with the targeted content associated with geo-fence 104. If geo-fence 104 is not determined to be associated with a third-party content provider or targeted content, the content server provides the application server with any targeted content, regardless of the content's geographic association.

Figure 2:
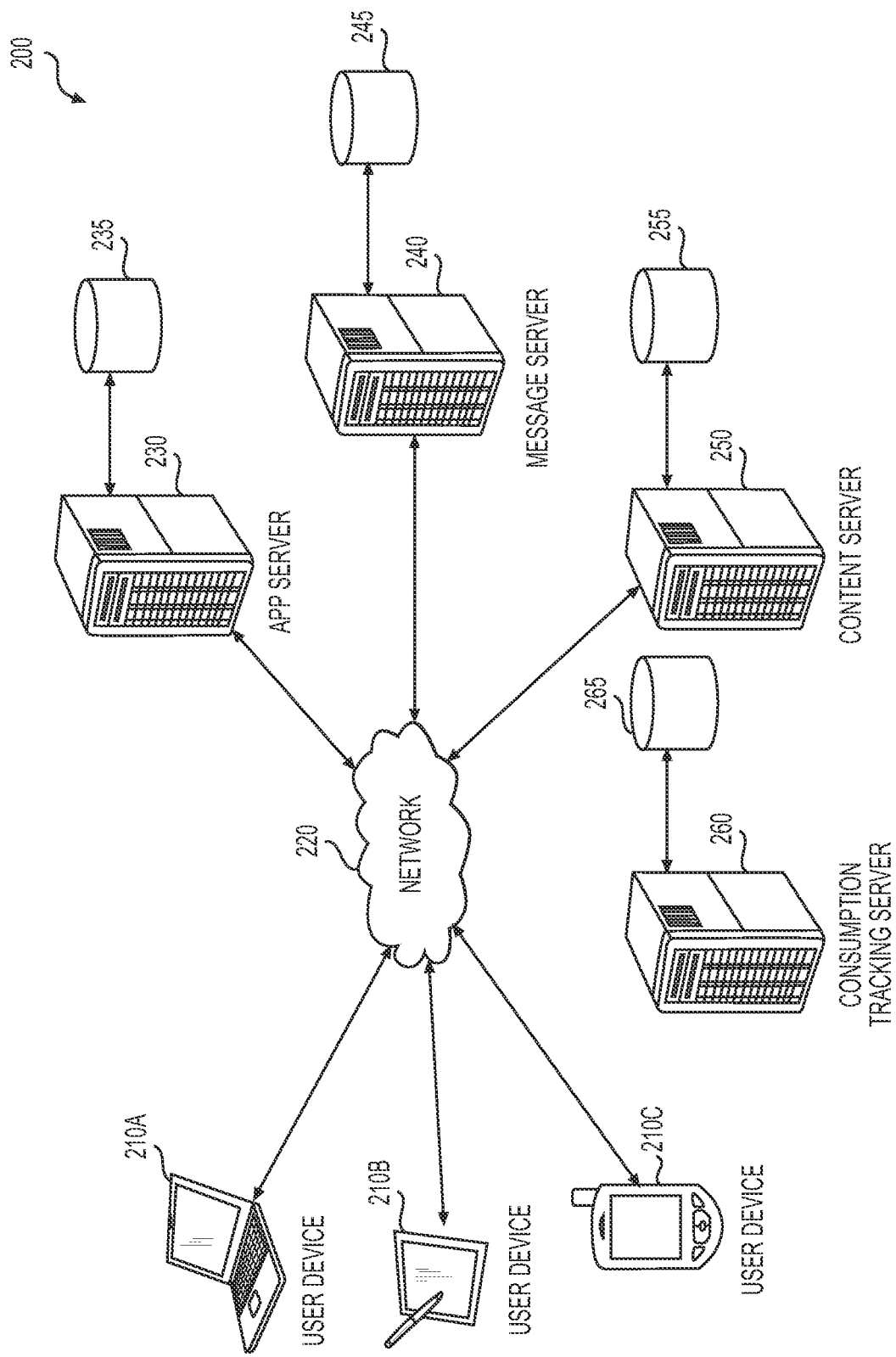
FIG. 2 is a block diagram of an exemplary communication system suitable for practicing an embodiment of the present disclosure.

FIG. 2 is a block diagram of an exemplary communication system 200 for practicing embodiments of the present disclosure. As shown in FIG. 2, system 200 includes user devices 210a, 210b, and 210c, an application server 230 coupled to a database 235, a message server 240 coupled to a database 245, a content server 250 coupled to a database 255, and a consumption tracking server 260 coupled to a database 265, all of which may be communicatively coupled via an electronic communication network 220.

Network 220 may be any type of electronic network or combination of networks used for communicating digital content and data between various computing devices. Network 220 may include, for example, a local area network, a medium area network, or a wide area network, such as the Internet. While only user devices 210a, 210b, and 210c are shown in FIG. 2, system 200 may include any number of user devices. Similarly, while only application server 230, message server 240, content server 250, and consumption tracking server 260 are shown in FIG. 2, it should be understood that system 200 may include additional or fewer servers, as desired for a particular implementation. Further, while not shown in FIG. 2, network 220 may include various switches, routers, gateways, or other types of network devices used to facilitate communication between various computing devices via network 220.

In the example shown in FIG. 2, user device 210a may be a laptop, notebook, netbook, or similar type of mobile computing device. User device 210b may be, for example, a tablet device or similar type of mobile device having a touchscreen display. User device 210c may be, for example, a mobile handset, smartphone, or personal digital assistant ("PDA"). However, it should be noted that each of user devices 210a, 210b, and 210c may be any type of mobile computing device configured to send and receive different types of data including, but not limited to, website data, multimedia content, electronic advertisements, and any other type of digital information, over network 220. Examples of such mobile computing devices include, but are not limited to, a laptop computer, a handheld computer, a personal digital assistant (PDA), a cellular telephone, a network appliance, a camera, a smart phone, an enhanced general packet radio service (EGPRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

Each of application server 230, message server 240, content server 250, and consumption tracking server 260 may be any of various types of servers including, but not limited to, a web server, a proxy server, a network server, or other type of server configured to exchange electronic information with other servers or computing devices via a communication network, e.g., network 220. Such a server may be implemented using any general-purpose computer capable of serving data to other computing devices including, but not limited to, user devices 210a, 210b, and 210c or any other computing device (not shown) via network 220. Such a server may include, for example and without limitation, a processor and memory for executing and storing processor-readable instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory and graphical user interface display. The server may also be implemented using multiple processors and multiple shared or separate memory devices within, for example, a clustered computing environment or server farm.

Also, as shown in FIG. 2, application server 230, message server 240, content server 250, and consumption tracking server 260 are communicatively coupled to databases 235, 245, 255, and 265, respectively. Each of databases 235, 245, 255, and 265 may be a data store or memory accessible to the corresponding server and may be implemented using any type of data storage device or recording medium used to store various kinds of data or content. Such data or content may include, for example and without limitation, text or media content that may be later provided to each of user devices 210a, 210b, and 210c via network 220.

In an example, each of user devices 210a, 210b, and 210c may execute a client application that communicates with application server 230, message server 240, content server 250, and consumption tracking server 260 via network 220. Further, each of user devices 210a, 210b and 210c may be configured to receive application content through an interface provided by application server 230 via network 220. The content provided by application server 230 may be based on, for example, user requests initiated via a GUI of the client application executable at each device. The GUI of the client application executable at each of user devices 210a, 210b, and 210c may be configured to present the content to a user at each device via a display of the respective user devices 210a, 210b, and 210c. The GUI of the client application may include, for example, various control elements enabling the user to request various types of content, e.g., which may be associated with a web site maintained by the application service provide. Further, a portion of the GUI of the client application may serve as a content view area used to display content (e.g., electronic advertisements) from a third-party content provider associated with content server 250. Such a content view of the client application may be a dedicated content area, e.g., displayed at the very top or bottom portion, of the application's GUI. As described above, such third-party content, e.g., as provided by content server 250 via network 220, may be displayed within the content view of the client application when the client application is actively executing at user device 210a, 210b, or 210c. Also, as described above, such third-party content may be different from the messages sent by an application provider for display to the user via a general message notifications interface of the operating system at user device 210a, 210b, or 210c, even when the client application is dormant or not actively executing at the particular device.

Application server 230 may be configured to host a web service that provides users various types of functionality via a GUI of the client application executable at each of user devices 210a, 210b, and 210c. Such functionality may include, for example and without limitation, providing digital content distributed by an application service provider associated with the client application. The application service provider may be, for example, an online content provider, including those associated with various search engines, e-mail programs, RSS feed providers, magazines, e-zines, blogs, or any other online site or program that publishes or distributes online content related to, for example, news or various topics of general public interest. As described above, a functionality provided by such an application service provider may include sending messages, e.g., push notifications, related to topics of interest, as specified by a user/subscriber of each user device. Also, as described above, the messages sent to each device may be displayed for the user via a message notifications interface of a mobile operating system at each of user devices 210a, 210b, and 210c if, for example, the client application has not been launched by the user or is not actively executing at the user's device.

Further, application server 230 and message server 240 may be configured to communicate with content server 250 or one or more other third-party content servers (not shown) to retrieve content (e.g., electronic advertisements) via network 220 to be displayed within a content view of a client application executable at each of user devices 210a, 210b, and 210c. Further, application server 230, message server 240, content server 250, and consumption tracking server 260 may each interact with one another, user devices 210a, 210b, or 210c, or any other servers or network devices (not shown) via network 220. Examples of such other servers include, but are not limited to, DNS servers, ad servers, and content distribution servers.

Message server 240 in this example may be configured to control the timing of messages or push notifications to be sent via network 220 to each of user devices 210a, 210b, and 210c based on the current geographic location of each device relative to one or more geographic areas associated with a threshold level of content consumption, e.g., geofenced areas 102 and 104, as described above. In an example, message server 240 may delay the sending of a message when the current geographic location of the device is determined not to be located within at least one of these geographic areas associated with a threshold level of content consumption. As will be described in further detail below, message server 240 may add the message to a message queue for the client application. Message server 240 may be configured to send the message from the message queue to user device 210a, 210b, or 210c via network 220, upon receiving an indication of an updated current geographic location of the device and determining that the new or updated location corresponds to a geographic area associated with a threshold level of content consumption.

In an example, message server 240 may communicate with content server 250 to determine whether or not the current geographic location of user device 210a, 210b, or 210c is within a geo-fence associated with targeted content, as described above and as will be described in further detail below. Content server 250 may be configured to receive a request including the current geographic location of user device 210a, 210b, or 210c from message server 240 and send appropriate targeted content to message server 240 after determining whether the received geographic location corresponds to a geo-fence associated with targeted content.

In some implementations, message server 240 may be implemented as a back-end component that interfaces with only application server 230, content server 250, and consumption tracking server 260. Thus, it should be noted that for some implementations, message server 240 may be configured to act as an intermediary between application server 230 and content server 250 or application server 230 and consumption tracking server 260, without any direct communication with any of user devices 210a, 210b, or 210c, in order to facilitate the message notification timing functionality described herein. Accordingly, application server 230, message server 240, content server 250, and consumption tracking server 260 may be configured to exchange information in the form of messages, requests, or responses that are passed between the servers. The communication between application server 230, message server 240, content server 250, and consumption tracking server 260 may be over network 220 or a virtual private network accessible to each server. In an example, messages added to the message queue may be routed from message server 240 to application server 230, when it is determined that user device 210a, 210b, or 210c is located within a geographic area associated with a threshold level of content consumption area. Application server 230 may then send the routed message to user device 210a, 210b, or 210c via network 220. However, it should be noted that the functions performed by application server 230, message server 240, content server 250, consumption tracking server 260, or any combination thereof, as described herein, may be implemented using a single server. Additional features and characteristics of the communication between user devices 210a, 210b, and 210c, application server 230, message server 240, content server 250, and consumption tracking server 260 will be described in further detail below with respect to FIGS. 3 and 4.

Figure 3:
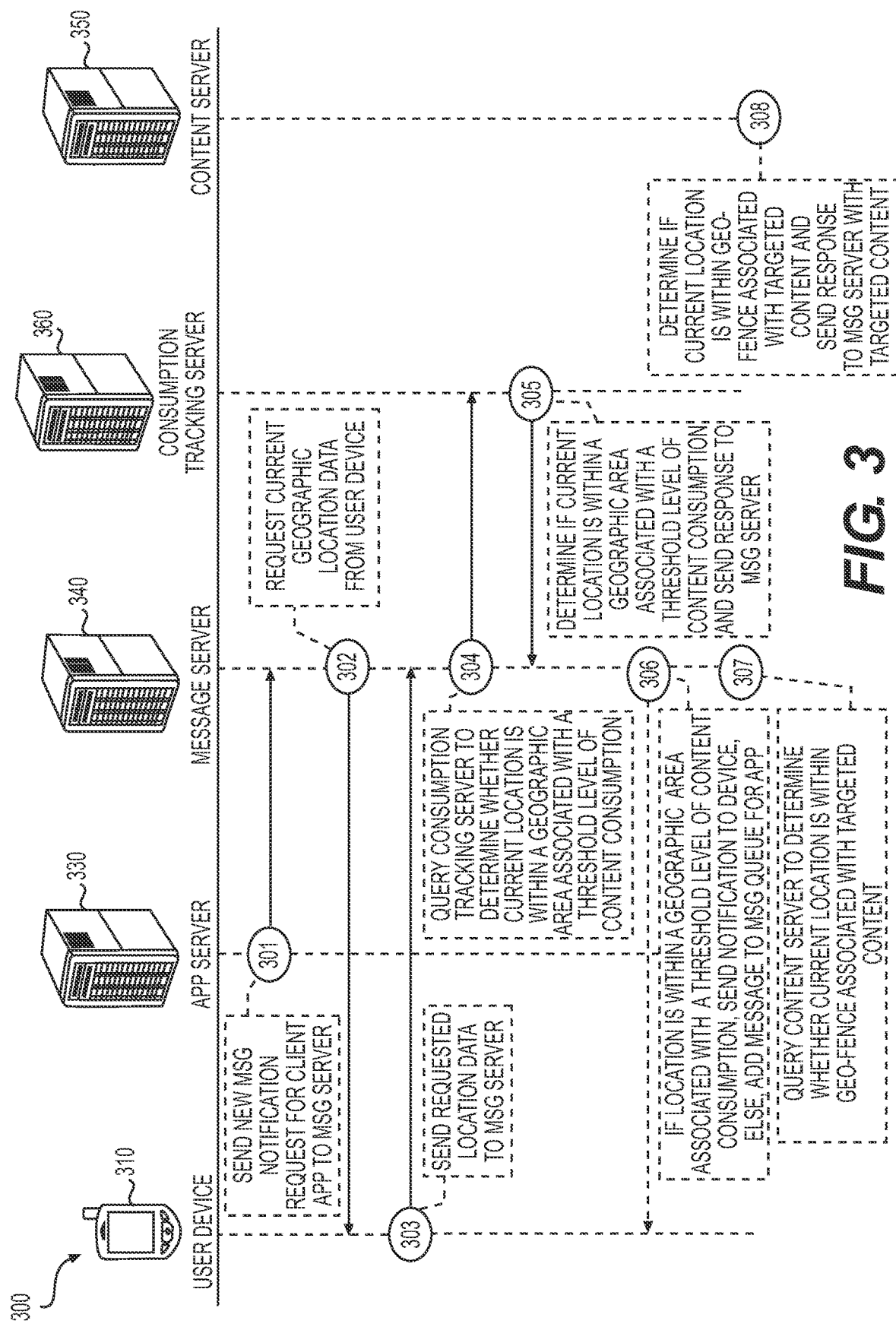
FIG. 3 is a communication flow diagram of an exemplary process for optimizing the timing of message notifications for a mobile device user based on a current geographic location of the user's device relative to a geographic area associated with a threshold level of content consumption.

FIG. 3 is a communication flow diagram of an exemplary process 300 for optimizing the timing of message notifications for a mobile device user based on a current geographic location of the user's device relative to geographic areas associated with a threshold level of content consumption, as described above. The example shown in FIG. 3 illustrates the communication flow between a user device 310, an application server 330, a message server 340, a content server 350, and a consumption tracking server 360. For purposes of discussion, process 300 will be described using map 100 of FIG. 1 and system 200 of FIG. 2, as described above, but process 300 is not intended to be limited thereto. Thus, user device 310 may be implemented using, for example, any of user devices 210a, 210b, or 210c of FIG. 2, as described above. Similarly, application server 330, message server 340, content server 350, and consumption tracking server 360 may be implemented using, for example, application server 230, message server 240, content server 250, and consumption tracking server 260, respectively, as described above.

As shown in FIG. 3, application server 330 may send a new message notification request for a client application executable at user device 310 to message server 340 via a communication network, e.g., network 220 of FIG. 2, as described above (step 301). Message server 340 may in turn request a current geographic location of user device 310 (step 302). The request may be sent by message server 340 directly to user device 310, as shown in FIG. 3, or alternatively, message server 340 may send the request to application server 330, which may then request the geographic location information from user device 310, if necessary. In some implementations, application server 330 may respond to the request from message server 340 by sending a last known or previously determined or estimated geographic location of user device 310, e.g., which may be stored in a memory or data store (e.g., database 235 of FIG. 2, as described above) coupled to application server 330. Accordingly, user device 310 may send the requested location data (or current geographic location information) to message server 340 (step 303), or to whichever server (e.g., application server 330) may have requested the information from user device 310.

Message server 340 may be configured to query consumption tracking server 360 to determine whether the current geographic location of user device 310 is within a geographic area associated with a threshold level of content consumption, as described above (step 304). If the current geographic location of user device 310 is determined (e.g., by app server 330) to be within a geographic area associated with a threshold level of content consumption, message server 340 may send the message notification to user device 310 for display to the user at user device 310 via a general notifications interface of the operating system of user device 310, as described previously (step 306). Alternatively, if the device's location is determined not to be within a geographic area associated with a threshold level of content consumption, the message may be added to a message queue to be sent at a later time, as described above.

In other implementations, the determination of whether the device's location corresponds to a geographic area associated with a threshold level of content consumption may be performed by message server 340 itself, e.g., based on information specifying one or more geographic areas associated with a threshold level of content consumption. Such information may be stored within a memory or data store (e.g., database 245 of FIG. 2) coupled to message server 340, as described above.

It should be noted that in some implementations, the message server 340 can also query the content server 350 (step 307) to determine whether the device's location corresponds to a geo-fence associated with targeted content. If the current geographic location of user device 310 is determined (e.g., by content server 350) to be within geo-fence associated with targeted content, content server 350 may provide the application server 330 with targeted content associated with that geo-fence to be displayed in the client application after said application has launched (step 309).

Figure 4:
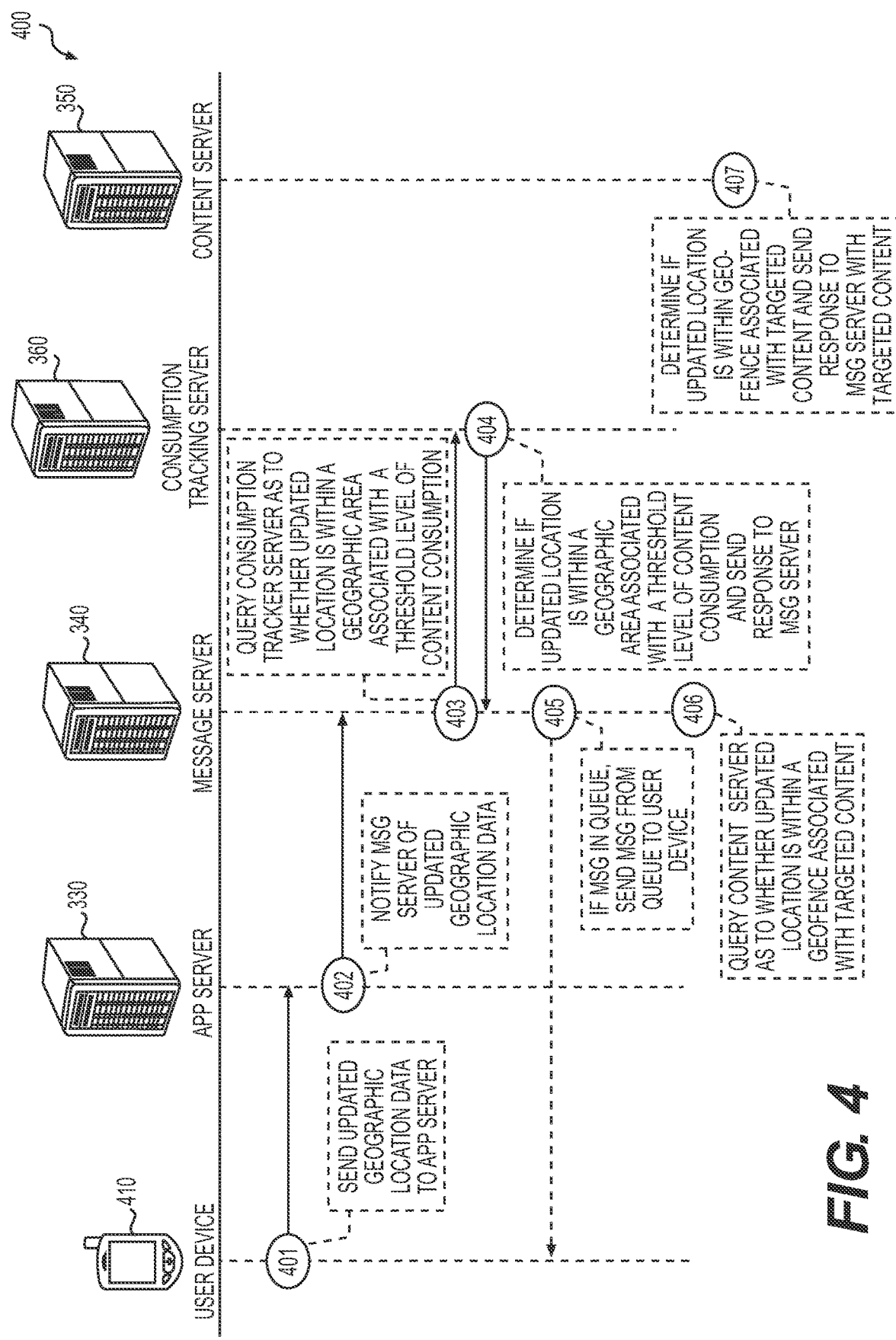
FIG. 4 is a communication flow diagram of an exemplary process for optimizing the timing of message notifications for the mobile device user of FIG. 3 based on a detected change in the current geographic location of the user's device relative to a geographic area associated with a threshold level of content consumption.

FIG. 4 is a communication flow diagram of an exemplary process 400 for optimizing the timing of message notifications for the user of mobile device 310 of FIG. 3, as described above, based on a detected change in the current geographic location of the user's device relative to a geographic area associated with a threshold level of content consumption. As shown in FIG. 4, the detected change in location may be based on, for example, an updated current geographic location sent by user device 310 or an operating system thereof to application server 330 via a network, e.g., network 220 of FIG. 2, as described above (step 401).

Application server 330 may then notify message server 340 of the updated geographic location information received from user device 310 (step 402). In response to the notification from application server 330, message server 340 may query consumption tracking server 360 as to whether the updated current location of user device 310 is within a geographic area associated with a threshold level of content consumption (step 403). The results of the determination may be sent in a response from consumption tracking server 360 to message server 340 (step 404). If the response from consumption tracking server 360 indicates that the updated location is within a geographic area associated with a threshold level of content consumption, message server 340 may check the message queue to determine if there are any pending message notifications within the queue that need to be sent to user device 310, e.g., as added previously by message server 340 (at step 306 of process 300 of FIG. 3, as described above). Message server 340 may send the message to user device 310 via a communication network, e.g., network 220 of FIG. 2 (step 405), only if a message is found within the message queue or do nothing otherwise.

If message server 340 in this example finds multiple messages within the message queue for the client application, message server 340 may be configured to select the appropriate message to send to user device 310 using any one of various priority schemes as desired for a particular implementation. Examples of such priority schemes include, but are not limited to, first-in-first-out (FIFO), last-in-first-out (LIFO), or an alternative scheme based on message priority. In an example, the priority scheme may be based on an expiration time associated with each message added to the message queue. The expiration time may be used to determine the maximum period of time that a message should be held in the message queue prior to being delivered to user device 310. In some implementations, the expiration time may reflect a priority level assigned to the message, e.g., by the application service provider associated with the client application, as described above.

The message server 340 may also query the content server 350 as to whether the updated current location of user device 310 is within a geo-fence associated with targeted content (step 406). The results of the determination may be sent in a response from content server 350 to message server 340 (step 407). If the response from content server 350 indicates that the updated location is within a geo-fence associated with targeted content, the content server 350 can provide or the message server 340 may query the content server 350 for targeted content associated with the geo-fenced area. Content server 350 may send the targeted content to the application server 330 for delivery within any launched client application. If the response from content server 350 indicates that the updated location is not within a geo-fence associated with targeted content, the content server 350 provides any targeted content, regardless of its geographic association to application server 330 for delivery within any launched application.

Figure 5:
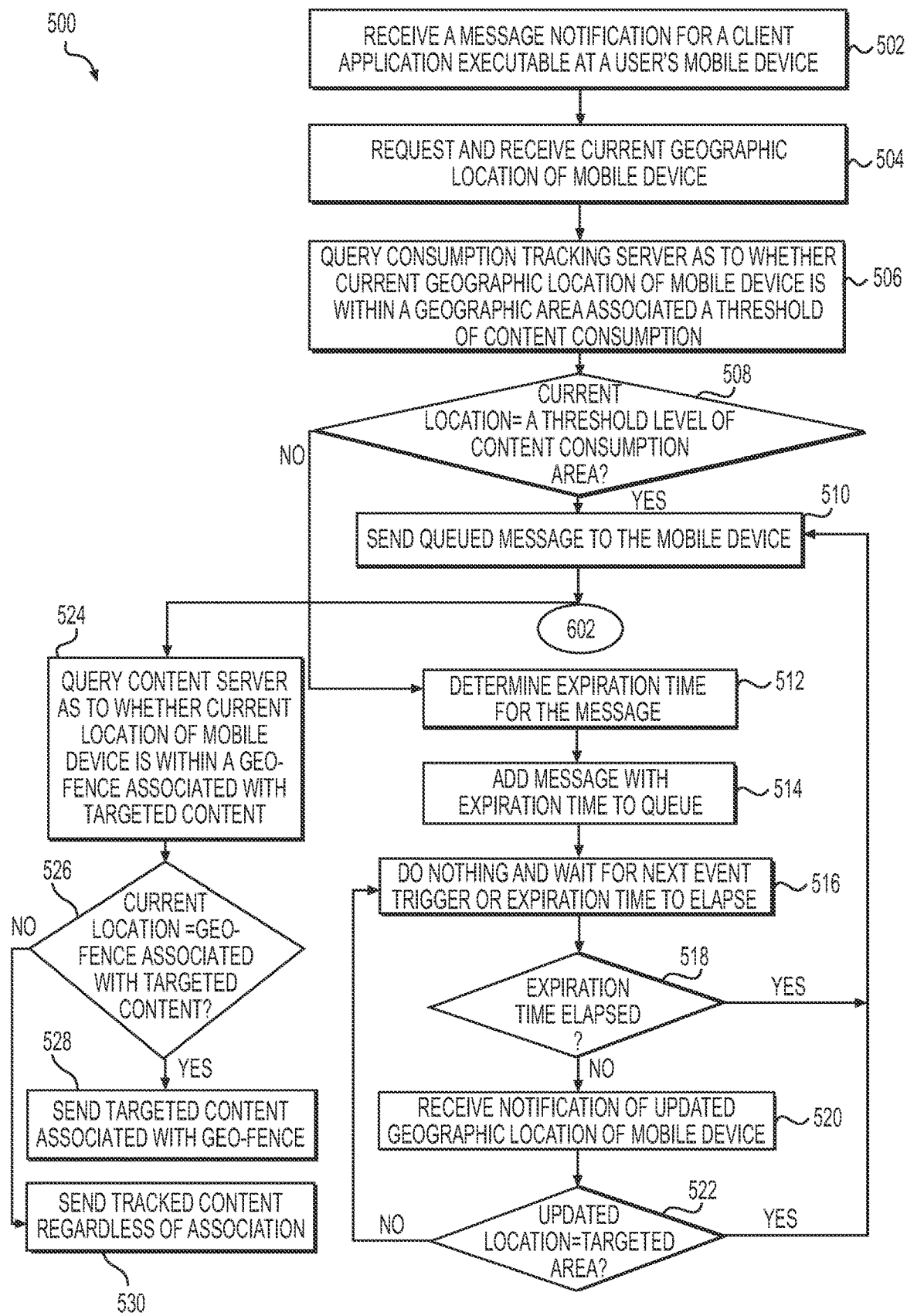
FIG. 5 is a process flow diagram of an exemplary method for optimizing the timing of message notifications for a mobile device user based on a current geographic location of the user's device relative to a geographic area associated with a threshold level of content consumption.

FIG. 5 is a process flow diagram of an exemplary method 500 for optimizing the timing of message notifications for a mobile device user based on a current geographic location of the user's device relative to a geographic area associated with a threshold level of content consumption. For purposes of discussion, method 500 will be described using system 200 of FIG. 2 and the components of processes 300 and 400 of FIGS. 3 and 4 (including application server 330, message server 340, content server 350, and consumption tracking server 360), as described above, but method 500 is not intended to be limited thereto. As shown in FIG. 5, method 500 includes steps 502, 504, 506, 508, 510, 512, 514, 516, 518, 520, 522, 524, 526, 528, and 530. However, it should be noted that method 500 may include more or fewer steps as desired for a particular implementation. In an example, one or more of the above-listed steps of method 500 may be executed by message server 240 of FIG. 2 or message server 340 of FIGS. 3 and 4, as described above. However, method 500 is not intended to be limited thereto, and the steps of method 500 may be performed by any server (e.g., application server 230 of FIG. 2 or application server 330 of FIGS. 3 and 4) or other type of computing device having at least one processor, a memory, and a network communication interface for sending and receiving information from one or more user devices.

Method 500 begins in step 502, which includes receiving a message notification for a client application executable at a user's mobile device (e.g., user device 210 of FIG. 2 or user device 310 of FIGS. 3 and 4, as described above). In step 504, a current geographic location of the mobile device is requested and received from the mobile device. Steps 506 and 508 may include, for example, determining whether a current geographic location of the mobile device is within a geographic area associated with a threshold level of content consumption. In some implementations, this determination may be based on a response received from querying a consumption tracking server (e.g., consumption tracking server 260 of FIG. 2 or consumption tracking server 360 of FIGS. 3 and 4) using the geographic location information received from the user's mobile device. If it is determined in step 508 that the current geographic location of the mobile device is within a geographic area with a threshold level of content consumption(step 508: Yes), method 500 may proceed to step 510, which includes sending a message from a message queue to the mobile device. Once the message has been sent, method 500 may proceed to step 602 of method 600 of FIG. 6, as will be described in further detail below.

If it is determined in step 508 that the current geographic location of the mobile device is within a geographic area associated with a threshold level of content consumption, method 500 may proceed to steps 524 and 526. Steps 524 and 526 may include, for example, determining whether a current geographic location of the mobile device is within a geo-fence associated with targeted content. In some implementations, this determination may be based on a response received from querying a content server (e.g., content server 250 of FIG. 2 or content server 350 of FIGS. 3 and 4) using the geographic location information received from the user's mobile device. If it is determined in step 526 that the current geographic location of the mobile device is within a geo-fence associated with targeted content, method 500 may proceed to step 528, which includes retrieving targeted content associated with the geo-fence from the content server. If it is determined in step 526 that the current geographic location of the mobile device is not within a geo-fence associated with targeted content, method 500 may proceed to step 530, which includes retrieving targeted content from the content server regardless of whether or not the targeted content is associated with a geo-fence.

However, if it is determined in step 508 that the current geographic location of the mobile device is not within a geographic area associated with a threshold level of content consumption(step 508: No), method 500 may proceed to step 512, which includes determining or calculating an expiration time associated with the message. In an example, the expiration time for a message may be based on a priority level assigned to the message, e.g., by an application service provider associated with the client application, as described above. Thus, a message having a relatively higher priority level may be assigned a relatively shorter expiration time, e.g., starting from the time that the message was added to the queue. In step 514, the message is added with the expiration time to the appropriate message queue. Method 500 then proceeds to step 516, which includes waiting for a predetermined event to be triggered or the expiration time of the message to elapse. An example of such a predetermined event includes, but is not limited to, receiving a notification of an updated or detected change in current geographic location for the mobile device.

If it is determined in step 518 that the expiration time for the message has elapsed, method 500 proceeds to step 510, in which the message is sent from the message queue to the user's mobile device. Otherwise, method 500 proceeds to step 520, which may include receiving a notification of an updated geographic location of the mobile device, e.g., a type of predetermined event trigger described above with respect to step 516. In step 522, it is determined whether the updated geographic location of the mobile device is within a geographic area associated with a threshold level of content consumption.

Figure 7:
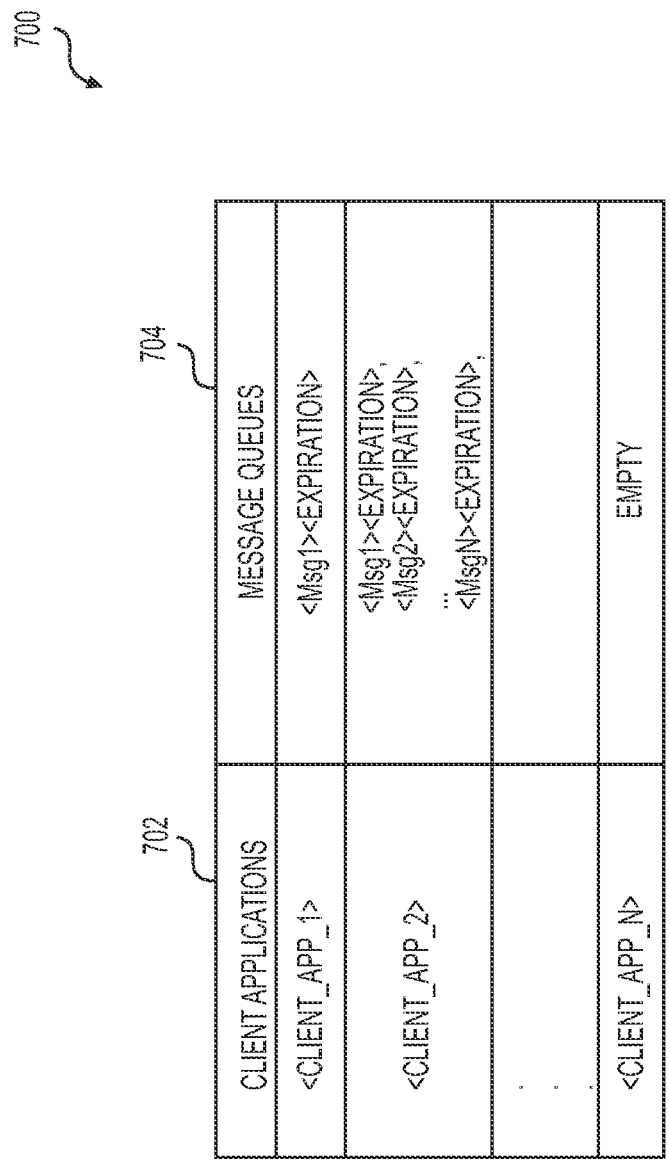
FIG. 7 is an exemplary table for associating different client applications with corresponding message queues.

It should be noted that step 510 may also include first checking the message queue to determine whether it includes any pending messages to be sent to the mobile device for the particular client application. The message queue in this example may be associated with the particular client application. In an example, an association between a queue of messages and a unique identifier associated with the client application may be maintained, e.g., by message server 240 of FIG. 2 or message server 340 of FIGS. 3 and 4, as described above. FIG. 7 shows an exemplary table 700 that may be used for associating different client applications, represented by corresponding client application identifiers 702 and their respective message queues 704. As shown in table 700, each message that is added to a message queue associated with a client application may include an expiration time used to determine the maximum amount of time that the message may be kept in the queue before being sent to the user's device, regardless of its current geographic location, as described above. Table 700 may be stored within a database (e.g., database 245 of FIG. 2) coupled to the server in this example.

Figure 6:
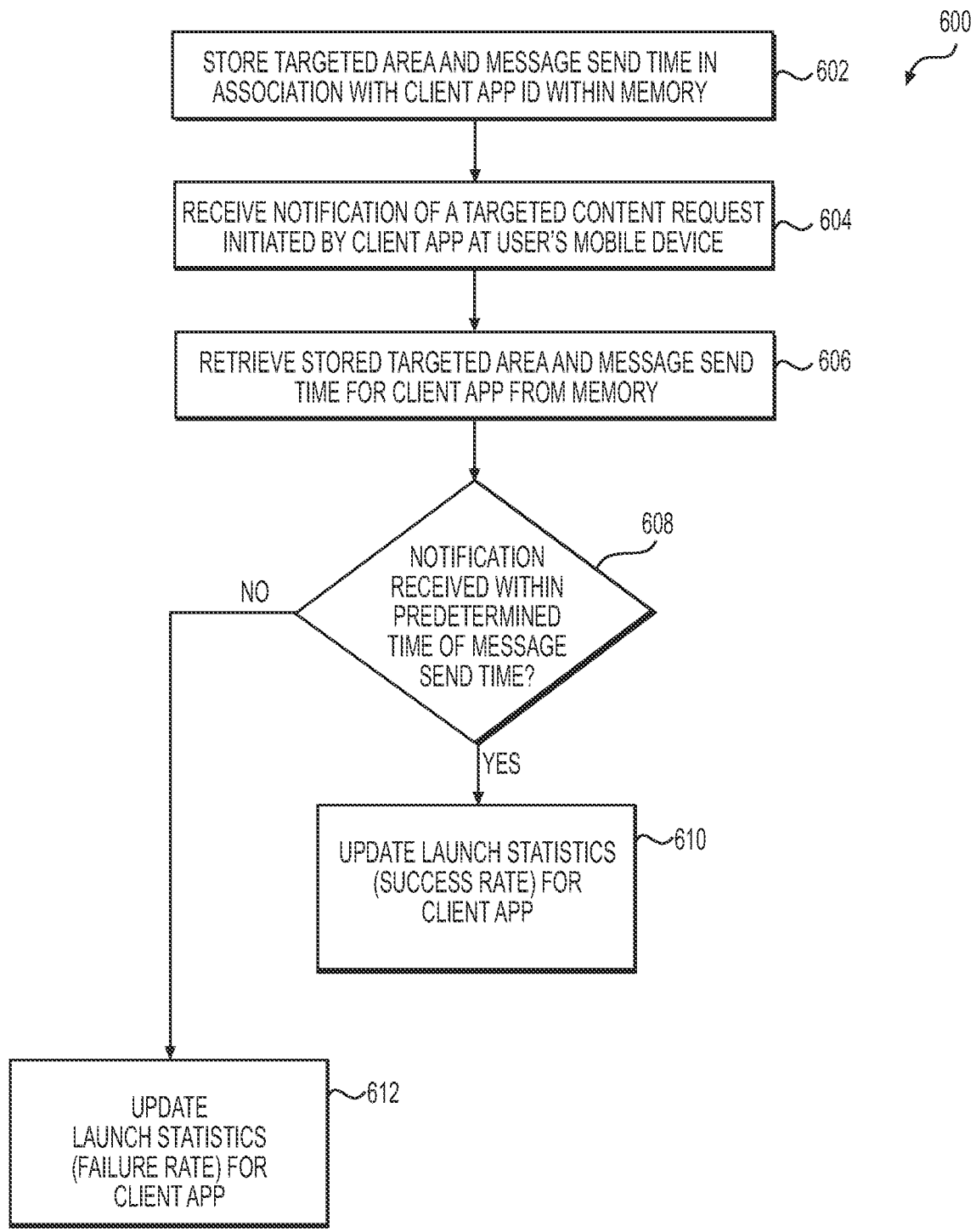
FIG. 6 is a process flow diagram of an exemplary method for updating launch statistics based on a recent message notification sent to the mobile device user of FIG. 5 within a predetermined period of time.

As described above, method 500 may proceed to step 602 of method 600 after a queued message is sent to the user's mobile device in step 510. As shown by the example of FIG. 6, the steps of method 600 may be used for updating launch statistics based on the message notification sent previously to the user's mobile device, as described above. In an example, the statistics may be updated for a particular message only within a predetermined period of time after the message was sent. Such a predetermined time period may be based on, for example, the expiration time associated with the message, as described above.

Like method 500, method 600 will be described using system 200 of FIG. 2 and the components of processes 300 and 400 of FIGS. 3 and 4, as described above, for discussion purposes only, but method 600 is not intended to be limited thereto. As shown in FIG. 6, method 600 includes steps 602, 604, 606, 608, 610, and 612. However, it should be noted that method 600 may include more or fewer steps as desired for a particular implementation. In an example, one or more of the above-listed steps of method 600 may be executed by message server 240 of FIG. 2 or message server 340 of FIGS. 3 and 4, as described above. However, method 600 is not intended to be limited thereto, and the steps of method 600 may be performed by any server (e.g., application server 230 of FIG. 2 or application server 330 of FIGS. 3 and 4) or other type of computing device having at least one processor, a memory, and a network communication interface for sending and receiving information from one or more user devices.

Method 600 begins in step 602, which includes storing information related to the geographic area associated with a threshold level of content consumption, which may have been previously identified based on the current geographic location of the mobile device, e.g., as determined by the message and/or content servers pursuant to steps 506 and 508 of method 500 of FIG. 5, a described above. Step 602 may also include storing a record of the time that the message was sent from the message queue to the user's mobile device (e.g., in step 510 of method 500), also referred to herein as the "message send time."

Method 600 then proceeds to step 604, which includes receiving a notification of a targeted content request initiated by the client application at the user's mobile device. In step 606, the stored information relating to a geographic area associated with a threshold level of content consumption and message send time for the previously sent message is retrieved for the client application from a memory device or data store (e.g., database 245 of FIG. 2). It is first determined in step 608 whether the notification of the initiated targeted content request is received within the predetermined time period of the message send time, as described above. If the notification is determined to be received within the predetermined time period, method 600 proceeds to step 610, method 600 proceeds to step 612, in which a set of launch statistics (e.g., a success rate) for the client application may be updated (e.g., increased or incremented by some predetermined value). In an example, the success rate may indicate a likelihood that targeted content was delivered to the user's device, as a result of the message notification timing functionality described herein, e.g., the message notification may have enticed the user at the mobile device to launch the client application and therefore view the targeted content, as previously described.

However, if the request is determined not to have been initiated by the client application within the predetermined time period (in step 608), method 600 proceeds to step 612, which also includes updating the targeted notifications statistics for the client application, except that a failure rate is updated (e.g., increased or incremented by some predetermined value). The failure rate may therefore indicate that the user did not launch the client application as a result of the notification.

Figure 8:
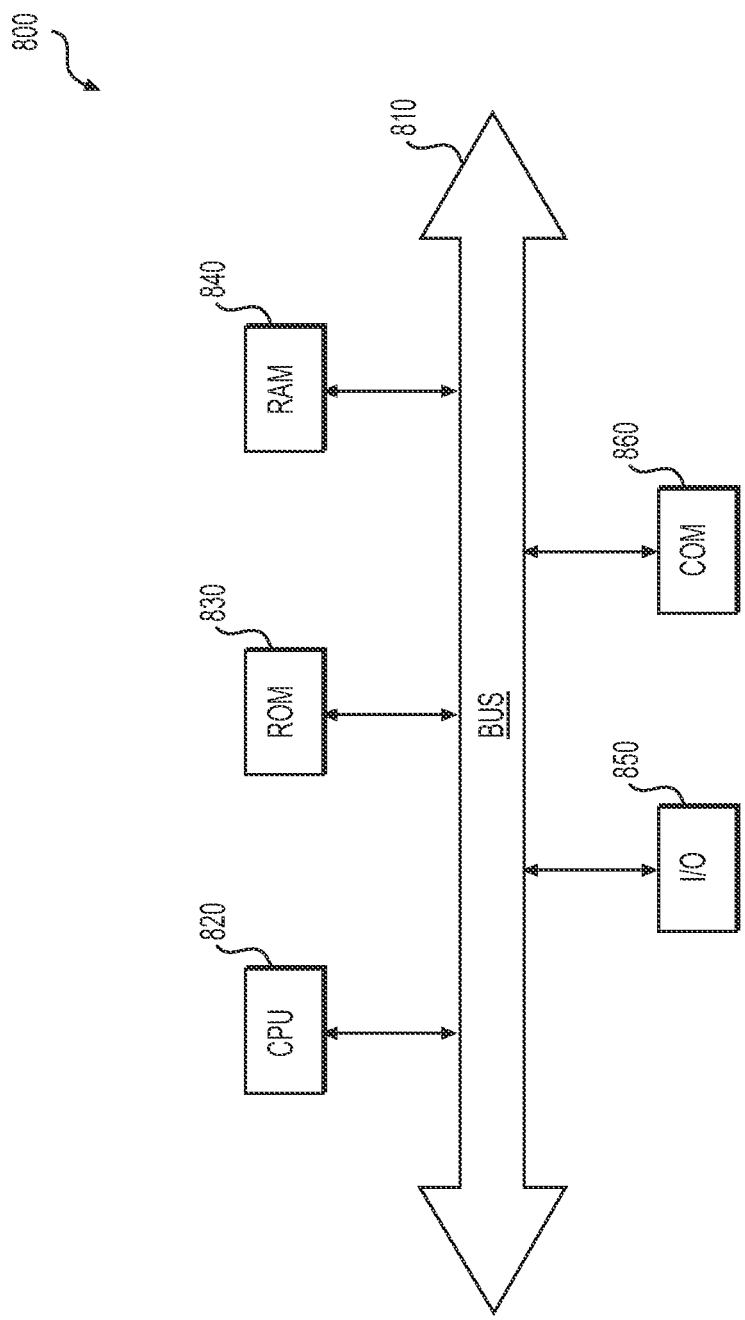
FIG. 8 is a block diagram of an exemplary computer system in which embodiments of the present disclosure may be implemented.

FIG. 8 provides a high-level functional block diagram illustrating an exemplary general purpose computer 800. Computer 800 may be used to implement, for example, any of application server 230, message server 240, content server 250, or consumption tracking server 260 of FIG. 2 in addition to application server 330, message server 340, content server 350, and consumption tracking server 360 of FIGS. 3 and 4, as described above. It is believed that those skilled in the art are familiar with the structure, programming and general operation of such computer equipment and as a result the drawings should be self-explanatory.

In an example, computer 800 may represent a computer hardware platform for a server or the like. Accordingly, computer 800 may include, for example, a data communication interface for packet data communication 860. The platform may also include a central processing unit (CPU) 820, in the form of one or more processors, for executing program instructions. The platform typically includes an internal communication bus 810, program storage and data storage for various data files to be processed and/or communicated by the platform such as ROM 830 and RAM 840, although the computer 800 often receives programming and data via network communications 870. The hardware elements, operating systems and programming languages of such equipment are conventional in nature, and it is presumed that those skilled in the art are adequately familiar therewith. Computer 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for timing message notifications to optimize delivery of content to mobile device users, the method comprising:
   receiving a current geographic location of a mobile device of a user via a communication network;
   determining whether the current geographic location of the mobile device is within a geographic area associated with a threshold amount of content consumption per unit of area of a certain segment of time;
   when the current geographic location of the mobile device is determined to be within the geographic area associated with the threshold amount of content consumption, displaying a message to the user at the mobile device;
   upon receiving an indication of a request for targeted content initiated at the mobile device in response to displaying the message, determining whether or not the request was initiated at the mobile device within a predetermined time period of when the message was sent to the mobile device; and
   updating a success rate indicating a likelihood of targeted content delivery to the mobile device as a result of message notification timing, when the request is determined to be initiated at the mobile device within the predetermined time period.

2. The method of claim 1, further comprising:
   displaying a message from a message queue to the user at the mobile device when either a detected change in the current geographic location of the mobile device is determined to be within the geographic area associated with the threshold amount of content consumption before a predetermined period of time has elapsed or once the predetermined period of time is determined to have elapsed.

3. The method of claim 2, further comprising:
   upon receiving an indication of an updated current geographic location of the mobile device, determining whether the updated current geographic location of the mobile device is within the geographic area associated with the threshold amount of content consumption; and
   displaying the message from the message queue to the user within a message notification interface when the updated geographic location of the mobile device is determined to be within the geographic area associated with the threshold amount of content consumption.

4. The method of claim 2, wherein determining whether the current geographic location of the mobile device is within the geographic area associated with the threshold amount of content consumption comprises:
   sending a request including the current geographic location of the mobile device to a consumption tracking server that is configured to determine whether the current geographic location of the mobile device corresponds to the geographic area associated with the threshold amount of content consumption; and
   receiving a response from the consumption tracking server indicating whether the current geographic location of the mobile device is within the geographic area associated with the threshold amount of content consumption based on the determination by the consumption tracking server.

5. The method of claim 1, wherein the targeted content is an electronic advertisement provided by a third-party content provider.

6. The method of claim 1, wherein upon receiving the requested current geographic location of the mobile device, determining whether the current geographic location of the mobile device is within a geo-fence associated with targeted content; and when the current geographic location of the mobile device is determined to be within a geo-fence associated with targeted content, sending targeted content associated with the geo-fence for display to the user within a client application.

7. The method of claim 2, wherein the predetermined period of time is based on an expiration time associated with the message in the message queue, and the message in the message queue is sent from the message queue for display to the user at the mobile device when either the current geographic location of the mobile device is later determined to be within the geographic area associated with the threshold amount of content consumption before the expiration time has elapsed or once the expiration time for the message in the message queue is determined to have elapsed.

8. The method of claim 7, wherein the expiration time associated with the message in the message queue is based on a priority level assigned to the message in the message queue by an application service provider.

9. The method of claim 1, wherein the amount of content consumption is measured as a number of new pages requested by the mobile devices of the mobile device users.

10. The method of claim 1, further comprising:
updating a failure rate indicating a likelihood that targeted content was not a result of message notification timing, when the request is determined not to be initiated within the predetermined time period.

11. The method of claim 1, wherein the amount of content consumption is further measured as a number of launched web browsers on mobile devices of the mobile device users.

12. A system for timing message notifications to optimize delivery of targeted content to mobile device users, the system comprising:
a memory having processor-readable instructions stored therein; and
a processor configured to access the memory and execute the processor-readable instructions, which when executed by the processor configures the processor to perform a plurality of functions, including functions to:
receive a current geographic location of the mobile device via a communication network;
determine whether the current geographic location of the mobile device is within a geographic area associated with a threshold amount of content consumption per unit of area of a certain segment of time;
displaying a message to a user at the mobile device when the current geographic location of the mobile device is determined to be within the geographic area associated with the threshold amount of content consumption;
receive an indication of a request for the targeted content initiated at the mobile device in response to displaying the message;
determine whether or not the request was initiated within a predetermined time period of the stored message send time; and
update a success rate indicating a likelihood of targeted content delivery to the mobile device as a result of message notification timing, when the request is determined to be initiated at the mobile device within the predetermined time period.

13. The system of claim 12, wherein the processor is further configured to perform functions to:

receive an indication of an updated current geographic location of the mobile device;
determine whether the updated current geographic location of the mobile device is within the geographic area associated with the threshold amount of content consumption; and
provide a message from a message queue to be displayed for the user at the mobile device when the updated geographic location of the mobile device is determined to be within the geographic area associated with the threshold amount of content consumption.

14. The system of claim 12, wherein the processor is configured to perform functions to:
send a request including the current geographic location of the mobile device to a consumption tracking server that is configured to determine whether the current geographic location of the mobile device corresponds to the geographic area associated with the threshold amount of content consumption for delivering targeted content to be displayed at the mobile device;
receive a response from the consumption tracking server indicating whether or not the current geographic location of the mobile device is within the geographic area associated with the threshold amount of content consumption based on the determination by the consumption tracking server; and
determine whether or not the current geographic location of the mobile device is within the geographic area associated with the threshold amount of content consumption on the received response.

15. The system of claim 12, wherein the processor is further configured to perform functions to:
determine whether or not the current geographic location of the mobile device is within a geo-fence associated with targeted content; and
when the current geographic location of the mobile device is determined to be within a geo-fence associated with targeted content, send targeted content associated with the geo-fence for display to the user at the mobile device.

16. The system of claim 12, wherein the predetermined period of time is based on an expiration time associated with a message in a message queue, and the message in the message queue is sent from the message queue for display to the user at the mobile device when either the current geographic location of the mobile device is later determined to be within the geographic area associated with the threshold amount of content consumption before the expiration time has elapsed or once the expiration time for the message in the message queue is determined to have elapsed.

17. The system of claim 12, wherein the amount of content consumption is measured as a number of new pages requested by the mobile devices of the mobile device users.

18. The system of claim 12, wherein the message is displayed to the user at the mobile device via a message notification interface of an operating system of the mobile device.

19. The system of claim 12, wherein the processor is configured to perform functions to:
update a failure rate indicating a likelihood that delivery of targeted content was not a result of message notification timing, when the request is determined not to be initiated at the mobile device within the predetermined time period.

20. A non-transitory computer readable medium storing instructions that, when executed by a computer, cause the computer to perform functions to:

receive a current geographic location of a mobile device via a communication network;

determine whether or not the current geographic location of the mobile device is within a geographic area associated with a threshold amount of content consumption per unit of area of a certain segment of time;

displaying a message to a user at the mobile device when the current geographic location of the mobile device is determined to be within the geographic area associated with the threshold amount of content consumption;

upon receiving an indication of a request for targeted content initiated at the mobile device in response to displaying the message, determining whether or not the request was initiated at the mobile device within a predetermined time period of when the message was sent to the mobile device; and updating a success rate indicating a likelihood of targeted content delivery to the mobile device as a result of message notification timing, when the request is determined to be initiated at the mobile device within the predetermined time period.

* * * * *